(12) United States Patent
Senior

(10) Patent No.: US 8,860,812 B2
(45) Date of Patent: Oct. 14, 2014

(54) AMBIENT PRESENTATION OF SURVEILLANCE DATA

(75) Inventor: Andrew William Senior, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 166 days.

(21) Appl. No.: 13/587,038

(22) Filed: Aug. 16, 2012

(65) Prior Publication Data

US 2012/0307073 A1 Dec. 6, 2012

Related U.S. Application Data

(62) Division of application No. 11/622,132, filed on Jan. 11, 2007.

(51) Int. Cl.
*H04N 7/18* (2006.01)

(52) U.S. Cl.
USPC .......................................... 348/159; 348/143

(58) Field of Classification Search
USPC ................................................... 348/159, 143
See application file for complete search history.

(56) References Cited

U.S. PATENT DOCUMENTS

| | | | | |
|---|---|---|---|---|
| 3,868,479 A | * | 2/1975 | Schweitzer et al. | 379/50 |
| 5,923,365 A | * | 7/1999 | Tamir et al. | 348/169 |
| 5,926,518 A | * | 7/1999 | Asokawa | 377/6 |
| 6,052,052 A | * | 4/2000 | Delmonaco | 340/539.11 |
| 6,057,761 A | * | 5/2000 | Yukl | 340/568.1 |
| 6,909,381 B2 | * | 6/2005 | Kahn | 340/945 |
| 7,203,669 B2 | * | 4/2007 | Lienhart et al. | 706/48 |
| 8,013,736 B2 | * | 9/2011 | Derrick et al. | 340/539.13 |
| 2002/0016971 A1 | * | 2/2002 | Berezowski et al. | 725/105 |
| 2002/0054666 A1 | * | 5/2002 | Kliland | 379/39 |
| 2003/0218537 A1 | * | 11/2003 | Hoch et al. | 340/524 |
| 2003/0223602 A1 | * | 12/2003 | Eichler et al. | 381/309 |
| 2004/0232218 A1 | * | 11/2004 | Graham | 235/379 |
| 2005/0024256 A1 | * | 2/2005 | Ridderheim et al. | 342/29 |
| 2005/0125083 A1 | * | 6/2005 | Kiko | 700/19 |
| 2007/0296577 A1 | * | 12/2007 | Stapleton | 340/566 |
| 2008/0048851 A1 | * | 2/2008 | Reyes et al. | 340/506 |
| 2008/0083403 A1 | * | 4/2008 | King et al. | 126/344 |

OTHER PUBLICATIONS

A. Hampapur, et al., "Smart Surveillance: Applications, Technologies and Implications", IEEE Pacific-Rim Conference on Multimedia, Singapore, Dec. 2003; pp. 1-6.

* cited by examiner

*Primary Examiner* — Patrice L Winder
*Assistant Examiner* — Ebrahim Golabbakhsh
(74) *Attorney, Agent, or Firm* — Tutunjian & Bitetto, P.C.; Preston J. Young

(57) ABSTRACT

A system and method for presentation of surveillance data includes a first environment including one or more sensors configured to monitor the first environment wherein data is collected by the one or more sensors. A second environment includes one or more information presentation devices configured to convey an event or state occurring in the first environment by altering an ambient sensory condition in the second environment, such that the ambient sensory condition is modified in accordance with a type and/or level of the event or state.

12 Claims, 4 Drawing Sheets

AMBIENT PRESENTATION OF SURVEILLANCE DATA

RELATED APPLICATION INFORMATION

This application is a Divisional application of co-pending U.S. patent application Ser. No. 11/622,132 filed on Jan. 11, 2007, incorporated herein by reference in its entirety.

BACKGROUND

1. Technical Field

The present invention relates to the field of surveillance systems, and more particularly to systems and methods for the presentation of surveillance data to humans.

2. Description of the Related Art

Surveillance is of increasing importance in today's world where ordinary businesses and institutions must be on guard for terrorist attacks, as well as the long-established threats such as theft and natural hazards. Increasingly technology is providing assistance, such as cameras and digital video recorders that make the task of security monitoring easier, but as prices fall, there is increasing pressure to install more and more data acquisition devices (cameras, badge readers, beam breakers, point-of-sales transaction loggers, etc.). The amount of this data is overwhelming for security guards who monitor these streams of information to look for the unusual events, which it is their responsibility to detect.

It is widely acknowledged that the tedious nature of surveillance video means that any security guard's attention will quickly wander. This limits the effectiveness of human monitoring after only a few minutes.

Today's security guards are often far removed from the patrolling night watchman of the past. They sit in central offices which may not even have windows to see the areas they are supposed to monitor. All information arrives via electronic means, e.g., through telephones, intercoms, electronic alarms and of course video.

While the security guard now receives information from all over the site being protected, the guard now also receives that information over a limited set of information channels, and no longer perceives the situation using all senses. The ability to investigate is severely hampered, often the only active investigation possible is to steer a Pan-Tilt-Zoom camera. This may limit the guard's effectiveness and problems of information overload and limited attention span rapidly arise.

SUMMARY

Present principles address the problem of information overload by controlling the way the data is presented to the human operator. Embodiments as disclosed herein rely on ambient information presentation and exploit human perception. By delivering rich surveillance data through multiple modes of communication, many of which do not require conscious attention, but can be monitored "passively", more effective monitoring can be achieved.

Many types of information can be made available to people through "ambient" channels without making demands on peoples' consciousness. Examples may include visualizing weather through rotating fans, stock market activity through the color of a lamp, or projection of information in deliberately non-intrusive ways.

Rich surveillance information provides ample scope for applying these methods in novel ways to solve the problem of information overload and attention span. In particular, new techniques for extracting information from surveillance data acquisition devices (e.g., cameras) may be employed, and a preferred embodiment exploits these techniques for reducing the data-rich but information-poor streams to manageable streams of information worth presenting to the users.

A system and method for presentation of surveillance data includes a first environment including one or more sensors configured to monitor the first environment wherein data is collected by the one or more sensors. A second environment includes one or more information presentation devices configured to convey an event or state occurring in the first environment by altering an ambient sensory condition in the second environment, such that the ambient sensory condition is modified in accordance with a type and/or level of the event or state.

A system and method for presentation of surveillance data includes one or more sensors to acquire data and a processing unit to extract information from the data and simulate the information for given events. Information presentation devices present simulations of the information in a spatial relationship relative to an environment of a monitoring operator such that the spatial relationship conveys the information to the operator for the given events.

The system may monitor any environment and may include a shop, a mall, a bank, a public space, etc. where the states and conditions conveyed include one or more of the following: a number of people in a space or a part of the space; transactions occurring in the environment; behaviors of people in the environment; lengths of queues/lines; anomalous conditions in the environment.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
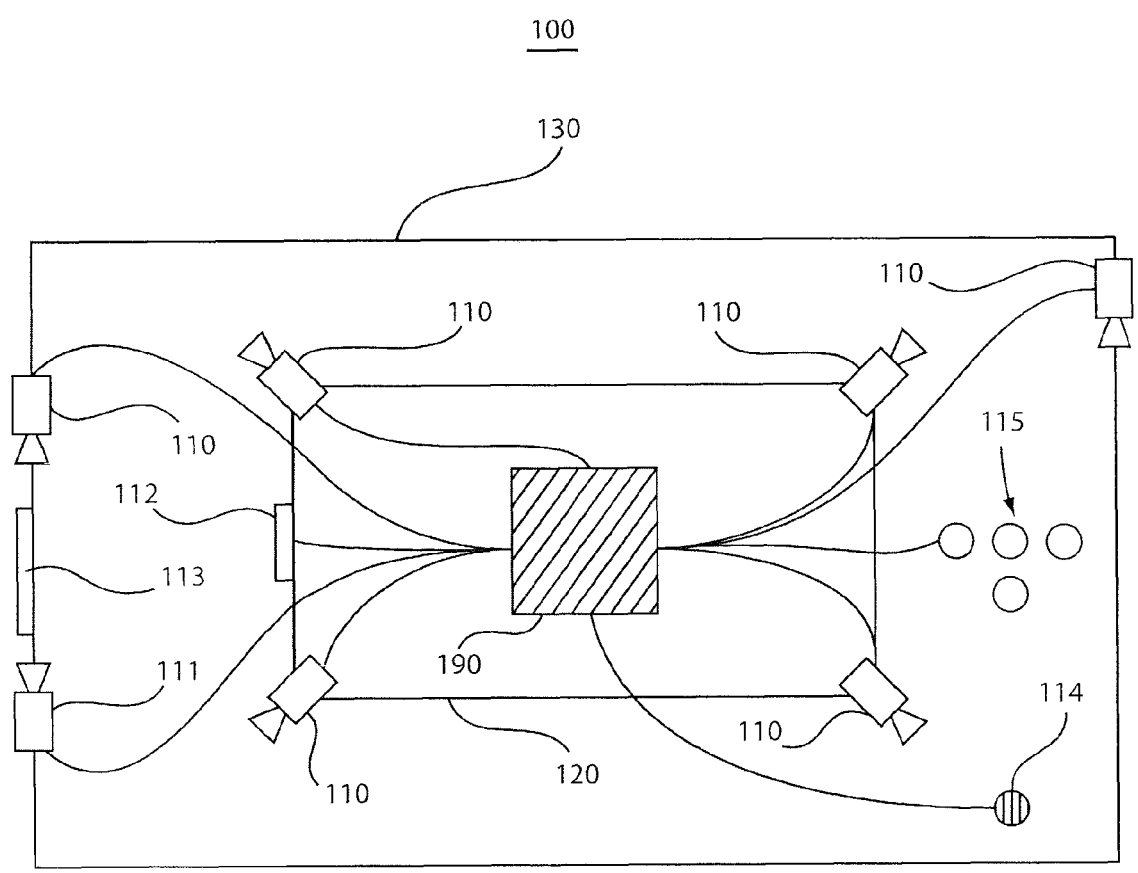
FIG. 1 is a schematic diagram showing a secured building to demonstrate an illustrative configuration in accordance with present principles.

The present principles employ ambient information presentation techniques to deliver information from surveillance data acquisition devices to a security guard or other human operator. Ambient information presentation involves many modes of information presentation, but in particular, exploits the strengths of human perception to deliver information to the user without requiring conscious attention. Human beings are constantly aware of information channels such as peripheral vision, background sound, air movement, vibration, etc. even when we are intensely focused on a task involving other senses.

The present embodiments provide the presentation of surveillance information to these peripheral senses, which involves extraction of key information from the original "raw" data acquired from surveillance sensors, and presentation of the key information through a peripheral information channel.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

It should be understood that the "ambient" information presentation does not have to replace the traditional information delivery mechanisms of video monitors and alerts, or newer mechanisms such as computer search interfaces. Instead, such presentations may be employed to assist in part or as a whole the monitoring tasks performed. Alerts will still be employed to demand the urgent attention of guards in special situations.

Video monitors will still display rich video of events that the guard can focus on, but the ambient techniques of the present principles can deliver an additional set of information that is currently unavailable or ignored, making the guard more aware and better able to do his job.

In one illustrative embodiment, five levels of information presentation may be made available to surveillance employees, needing different levels of attention: 1) Active searches initiated by the employees to acquire specific information; 2) Alerts that make the employees aware of situations that need their attention; 3) Browsing through summarized information, where the employee concentrates on a particular task, but important information is highlighted for them; 4) Watching video, wherein the employee is passively looking for events of interest, but needs to maintain a high level of concentration to be effective; and 5) Ambient information presentation wherein the employee is passively informed of surveillance system information needing little or no focus of attention.

Thus, it can be seen that this disclosure provides a method of information presentation that is complementary to existing forms of delivering information to surveillance systems users that are in place today.

Referring now to the drawings in which like numerals represent the same or similar elements and initially to FIG. 1, an illustration of an example surveillance site 100 for a secure facility is depicted. A building 120 is surrounded by a perimeter fence 130. Within the building 120, a control room 190 receives video from sensors, such as cameras 110, Infra-red cameras 111, microphones 114, microphone arrays 115 or any other surveillance sensors. Doors may be equipped with sensors such as a badge reader 112, or a pressure sensor 113, which also provide data to the control room 190.

Figure 2:
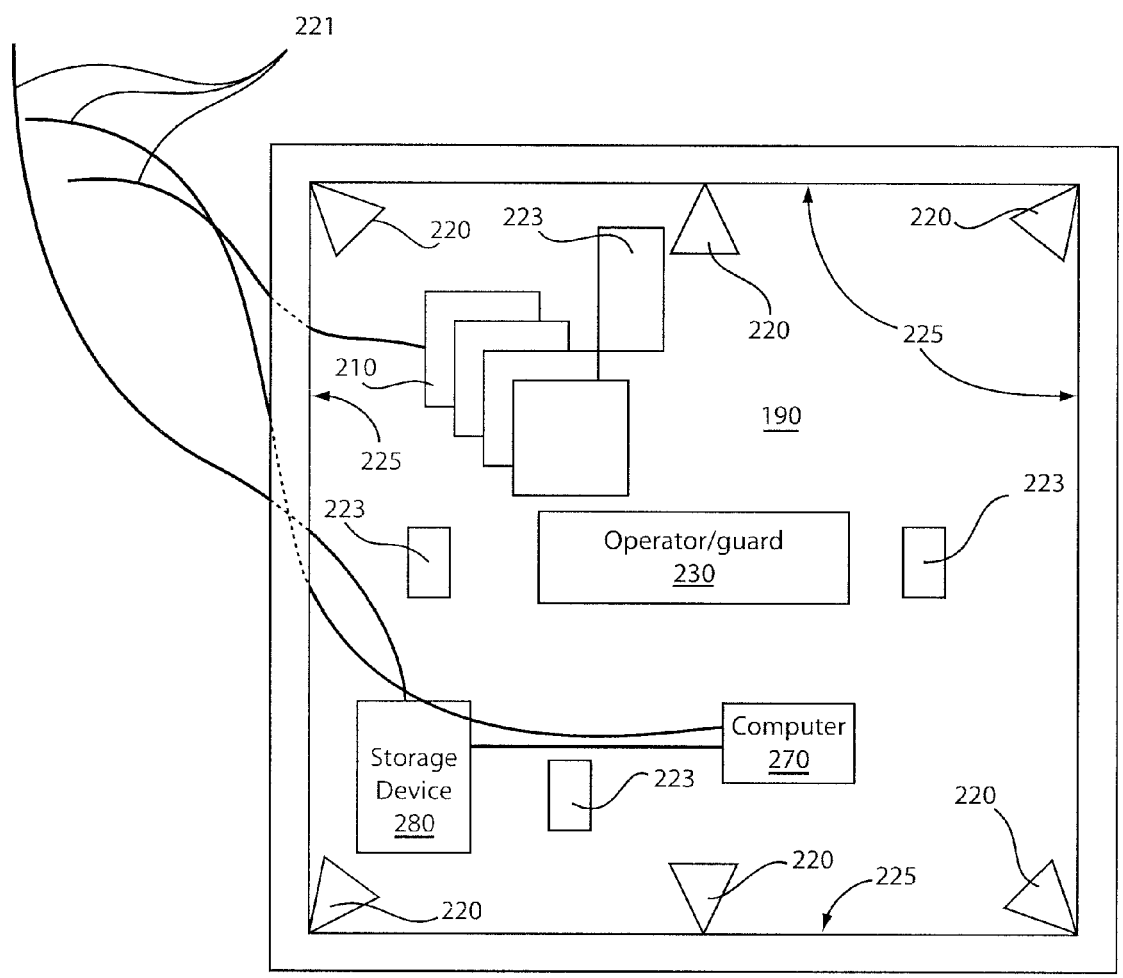
FIG. 2 is a schematic diagram showing greater detail of a control room or other monitoring environment in accordance with present principles.

Referring to FIG. 2, a more detailed representation of the control room 190 is shown. Actuators or transducing elements 220, and 225 are included within the control room 190 or equivalent environment to present information to a security guard 230 or other monitor.

In one embodiment, sensors 110, 111, etc. are deployed around a secure facility 100 in a surveillance system (FIG. 1). Sensor outputs are delivered to the control room 190 via cables 221, wireless channels, etc., for presentation on devices such as, video monitors 210. The sensor outputs are preferably recorded with recording devices 280 for future reference. In addition, the sensor outputs are delivered to computer(s) 270 which apply information extraction algorithms such as those described in A. Hampapur, L. Brown, J. Connell, S. Pankanti, A. W. Senior, and Y.-L. Tian, *Smart Surveillance: Applications, Technologies and Implications*, IEEE Pacific-Rim Conference on Multimedia, Singapore, December 2003, which is incorporated herein by reference in its entirety.

Figure 3:
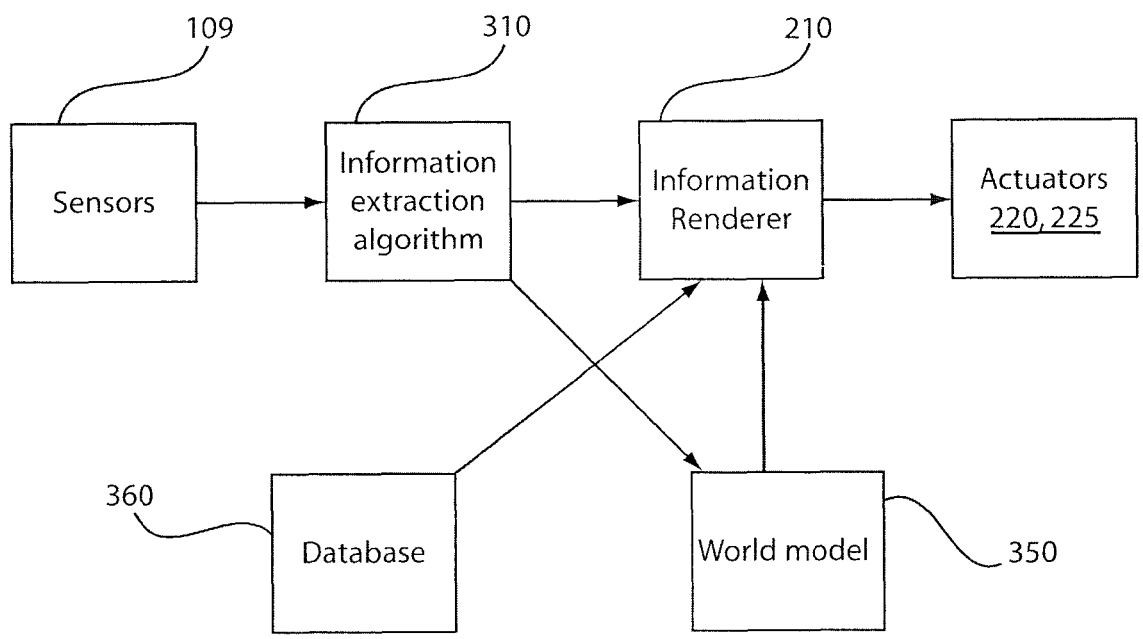
FIG. 3 is a block diagram showing a system/method for extracting, simulating and representing surveillance data in accordance with present principles.

Referring to FIG. 3, a block diagram of an illustrative system 300 is shown in accordance with one embodiment. Sensors 109 (e.g., sensors 110-114 in FIG. 1) provide data to a computer 270 (FIG. 2). Computer 270 stores and executes information extraction algorithms 310. These algorithms may track moving objects seen by the cameras, and store the track data in a database 360. The extracted information may be assembled together in a world model 350, which models, among other things, the relationship (e.g., relative position and orientation) between sensors.

The information from the database 360 and world model 350 is delivered to a rendering engine 210 that presents some of this information to a security guard 230 (FIG. 2), through actuators/transducers 220, 225, etc. to provide or alter an ambient sensory condition in the operators environment. In a preferred embodiment, some of these actuators/transducers are loudspeakers 220, delivering spatialized multi-channel sound. Sounds acquired from microphones, 114, 115, can be played through these loudspeakers 220 as though originating from the direction where the sound was recorded. With source localization techniques such as beam-forming using microphone arrays 115, the actual sound source origin may be located automatically and used for the representation of the sound through the loudspeakers 220. The sound source may alternatively be determined by visual localization techniques (e.g., lights indicating source), or multimodal (e.g. audio-visual) localization methods. In this way, the guard can hear acoustic events that happen beyond his often sound proofed control center. The sound of a fence being cut, or a car accelerating that would otherwise be lost are now available and presented with the additional information of originating location that would be unavailable in a traditional set up that used microphones. (Note many countries forbid the use of microphones for acquisition of surveillance data).

Sounds can be used to represent other events acquired from other sensors, and synthesized sounds can be used to represent events acquired from microphones or a combination of sensors. For example, a swipe could be heard when a badge-in event (from sensor 112) is detected, and another effect or sound when a parking lot barrier goes up. Footsteps can be simulated as a person walks around the perimeter, or engine noise played as a vehicle drives through the parking lot where the sound is provided to a different speaker 220 as the motion progresses. Each of these events relies on vision algorithms 310 to detect the moving object, classify the object as car or person, and determine its location both within the image but also, consequently, in the real world. Thus, the object's position relative to the guard and his control room are provided. With increasingly sophisticated methods, the type of car and speed could control the sound delivered to the guard, as could the gait and precise footfalls of the pedestrian. Since a computer mediates the delivery of information, the delivery can be made much more sophisticated, using any available information source (such as historical records or predictions of data like number of customers; transaction log information; predicted or measured weather data; government published terrorist threat level) in mathematical or logical combinations to determine the system's output. For instance, limiting the pedestrian "sonification" to pedestrians by the south fence, or between midnight and 6 AM or only those exceeding 4 mph. The delivery volume could be set to decrease during quiet watches or rise when a radio or other ambient noise is present.

The guard would be able to customize the signals/acoustics to limit the information delivered through this channel to remove "noise", and control the system to deliver only information perceived as useful. The delivery channel is "passive", and the guard can continue to watch monitors, read the newspaper, or perform other tasks, while still being made aware of certain events, such as, when someone starts running or when a vehicle is passing.

Similar passive information can be delivered through other media. Referring again to FIG. 2, in addition to traditional monitors 210, the walls of the control room 190 could become presentation screens 225 that deliver spatialized video, rendered, as though the building were transparent. 2-Dimensional and 3-Dimensional image transformation algorithms permit such presentations even when the camera may not be looking outward. Multiple layers of information (interior views and exterior views) in the same direction could be overlayed with computer graphics transparency techniques.

As in privacy protection systems, the video can be enhanced or re-rendered to highlight some information or to mask distracting irrelevant information or privacy-intrusive details. For example, the "transparent walls" view might mask all activity on a highway or beyond the fence of the facility, preventing distraction. The facility displayed could be a graphical representation or a "typical" background view onto which relevant objects were rendered. For example, all those people detected and behaving "normally" could be masked out of this ambient view, only those in secure areas, or running etc. would need to be presented on screens 225 (or on monitors 210).

The control room 190 may be configured to be able to represent more than one monitored environment, e.g., a north wall (or screen 225) may monitor the Chicago office while the south wall (or screen 225) simultaneously monitors the New York office.

Advantageously, the presentations on screens 225 would leverage human peripheral vision, presenting no attention-catching activity when nothing unusual was happening, but delivering that information when predetermined conditions were met (whether those were written by the operator in rules, or derived automatically by an anomaly-detection algorithm). The presentations of screens or walls 225 may be provided using projectors 223 or larger screen displays/televisions.

Complex data can be represented in simplified ways, for example, a "crowd" in a shopping mall could be rendered as a single icon when detected, a disabled vehicle on a freeway could be depicted with a red halo and so on.

Other information modes may also be employed within the scope of the present principles. Other senses may be employed to convey simulated information representing real world information to a monitoring operator. For example, movement down a main hallway may be rendered as air currents using a fan. A heavy truck arriving at the loading dock may be rendered through vibration in a chair. Speed of traffic flow on a bridge may inversely control the brightness of a ceiling lamp. Changes in energy production at a power station may be rendered through modulations of the room temperature. Other applications and simulations may also be employed, for example, the intensity, frequency and direction of origin of energy (e.g., sound, light, etc.) from transducer elements may be such that altered or modulated such information is conveyed as a result of such changes.

In a retail setting, average sales volume from different stores may be rendered in a head office with sounds coming from appropriate directions. At a given store, cash register events could be rendered with sounds, and the total number of people in the store at a given time with background white noise. Lights around the room could have intensities modulated according to the number of people in different departments.

The system may monitor any environment, which may include a shop, a mall, a bank, a public space, etc. where the states and conditions conveyed include one or more of the following: a number of people in a space or a part of the space, transactions occurring in the environment, behaviors of people in the environment, lengths of queues/lines, anomalous conditions in the environment, etc.

Figure 4:
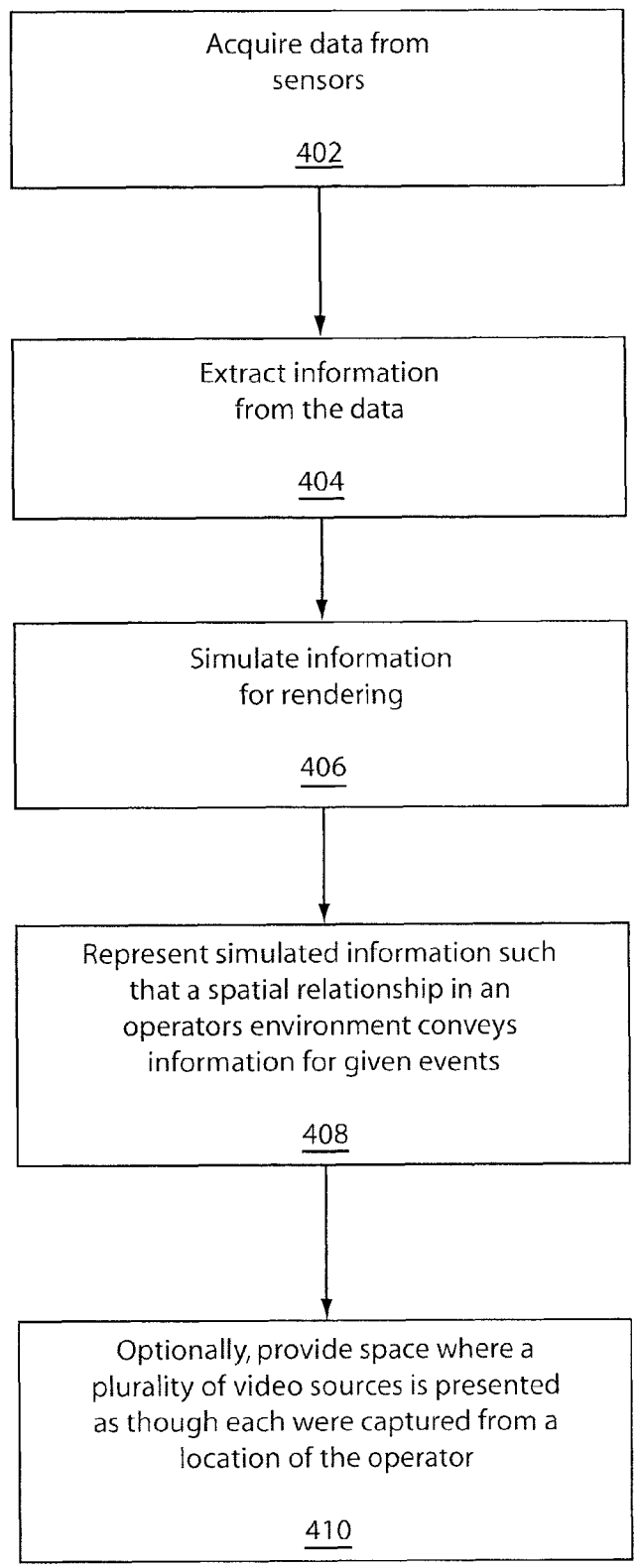
FIG. 4 is a block diagram showing another system/method for extracting, simulating and representing surveillance data in accordance with present principles.

Referring to FIG. 4, a system/method for presentation of surveillance data is presented in accordance with one illustrative embodiment.

In block 402, data is acquired from one or more sensors. These sensors may include microphones, cameras, pressure or light sensors (including IR), motion detectors, weight scales or any other sensing device. In block 404, information is extracted from the data. This may include extracting, e.g., at least one of speed, type, appearance, state, etc. of an object. This extraction is preferably performed using an information extraction algorithm to determine information of interest, such as the presence of a person in a secured area, a person running, a speeding vehicle, etc.

In block 406, the information extracted for given events is simulated or processed to be simulated on one or more information presentation (rendering) devices. In a preferred embodiment, the simulated information is perceivable by the operator other than by foveated vision. Simulations may include spatially representing information such that upon rendering an operator can learn the information based upon ambient events. For example, a crowd or a person may be represented as an icon (later to be displayed on a background image on a wall as an icon on a wall screen), or directional sound may be used to simulate a speed or direction of a passing vehicle, etc.

In block 408, using one or more of the information presentation devices, simulations of the information are represented in a spatial relationship relative to an environment of a monitoring operator such that the spatial relationship conveys the information to the operator for the given events. The one or more information presentation devices may include one or more wall screens, and object being tracked can be represented as an icon on the wall screen displays. The wall screen may include a background image representing a view of a monitored area and the spatial relationship may include the icon displayed against the background. For example, objects may be simulated on a background image on a wall (e.g., as an icon) or screen.

In another embodiment, the one or more information presentation devices may include a plurality of sound producing devices, and the plurality of sound producing devices provide the spatial relationship, such that the location from which a sound is generated conveys the information to the operator for the given events.

Directional sound may be employed to convey a speed of a passing vehicle, etc. such that different speakers are employed more or less at different times to spatially simulate motion using sound. An apparent sound origin conveys information derived from the data collected from the sensors, e.g., to simulate at least one of speed, type, appearance, and state of an object.

In one embodiment, a space for presentation of surveillance video, such as a control room, is provided, in block 410, where a plurality of video sources is presented as though each were captured from a location of the operator. In this way, walls of a control room may be made to give the effect or appearance of being invisible. In this way, the background of the wall image could appear as a view thorough the walls of the control room and icons or images may be employed to designate events occurring in spatial relationship to the background image (using, e.g., a "world" model). For example, if a car blows its horn, a horn image may appear on the background image representing the location from which the horn was activated. In addition, a speaker at that relative location may also be activated.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

Having described preferred embodiments of systems and methods for ambient presentation of surveillance data (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A system for presentation of surveillance data comprising:
a first environment including one or more sensors configured to monitor the first environment wherein data is collected by the one or more sensors;
a second environment including one or more information presentation devices configured to convey at least one of an event and a state occurring in the first environment by altering an ambient sensory condition in the second environment, such that the ambient sensory condition is modified in accordance with a type and/or level of the at least one of the event and the state, the second environment including a monitoring control room configured to isolate a monitoring operator such that the monitoring operator is precluded from directly perceiving the first environment from the monitoring control room.

2. The system as recited in claim 1, wherein the ambient sensory condition is visually perceivable by the operator other than by foveated vision.

3. The system as recited in claim 1, wherein the one or more sensors include cameras.

4. The system as recited in claim 1, wherein the one or more information presentation devices include one or more wall screens, wherein the wall screen displays a representation of an object being tracked.

5. The system as recited in claim 4, wherein the wall screen includes a background image representing a view of a monitored area and the ambient sensory condition includes the representation displayed against the background.

6. The system as recited in claim 4, wherein the representation of the object being tracked includes an icon.

7. The system as recited in claim 1, wherein the one or more information presentation devices include transducing elements including at least one of sound producing devices and light producing devices such that one or more of intensity, frequency and source location of energy from the transducing elements are temporally altered to convey the ambient sensory condition in accordance with the type and/or level of the event.

8. The system as recited in claim 7, wherein the transducing elements cooperate to provide a spatial relationship, such that a location from which sound or light is generated conveys information to the operator for given events.

9. The system as recited in claim 8, wherein the spatial relationship simulates at least one of speed, type, appearance, and state of an object.

10. The system as recited in claim 1, wherein the second environment includes a space for presentation of surveillance video wherein a plurality of video sources are presented of the first environment from a point of view of the second environment as though captured from a location of an operator.

11. The system as recited in claim 1, wherein the one or more information presentation devices are configured to convey one of the event and the state occurring in the first environment such that certain information is highlighted according to a criteria.

12. The system as recited in claim 1, wherein the one or more information presentation devices are configured to convey one of the event and the state occurring in the first environment such that certain information is masked according to a criteria.

* * * * *